United States Patent [19]

Doggett

[11] Patent Number: 4,808,832
[45] Date of Patent: Feb. 28, 1989

[54] REGISTRATION SYSTEM FOR A MOVING SUBSTRATE

[75] Inventor: David E. Doggett, Sunnyvale, Calif.

[73] Assignee: Synergy Computer Graphics Corp., Sunnyvale, Calif.

[21] Appl. No.: 198,624

[22] Filed: May 20, 1988

Related U.S. Application Data

[63] Continuation of Ser. No. 906,259, Sep. 11, 1986, abandoned.

[51] Int. Cl.⁴ .................. G01B 11/00; G01N 21/86; G05B 1/06
[52] U.S. Cl. .................. 250/548; 250/237 G; 250/557; 356/401
[58] Field of Search .......... 250/548, 557, 561, 237 G; 33/125 A; 356/400, 401; 355/14 R

[56] References Cited

U.S. PATENT DOCUMENTS

| | | | |
|---|---|---|---|
| 2,250,209 | 11/1939 | Shoults et al. | 250/548 |
| 3,427,463 | 2/1969 | Weyrauch | 250/237 G |
| 3,781,490 | 12/1973 | Phillips | 179/100.2 |
| 3,835,297 | 9/1974 | Inoue et al. | 250/557 |
| 4,079,252 | 3/1978 | Brake | 250/237 G |
| 4,363,271 | 12/1982 | Horst | 250/548 |
| 4,385,836 | 5/1983 | Schmitt | 250/237 G |
| 4,485,982 | 12/1984 | St. John et al. | 250/557 |
| 4,569,584 | 2/1986 | St. John et al. | 355/14 R |
| 4,641,070 | 2/1987 | Pfizenmaier et al. | 250/548 |

Primary Examiner—Edward P. Westin
Attorney, Agent, or Firm—Limbach, Limbach & Sutton

[57] ABSTRACT

A registration system is provided for maintaining accurate correspondence between an image on a moving substrate and the action of an operating element with respect to the substrate. A comparison optical device is mounted such that the timing marks pass in correspondence with the comparison optical device when the substrate is moving. A detector senses the intensity of radiation reflected from the substrate through the comparison optical device and generates a firing signal based on the reflected radiation intensity. The firing signal is provided to the operating element to activate it in correspondence to the passage of the timing marks.

18 Claims, 10 Drawing Sheets

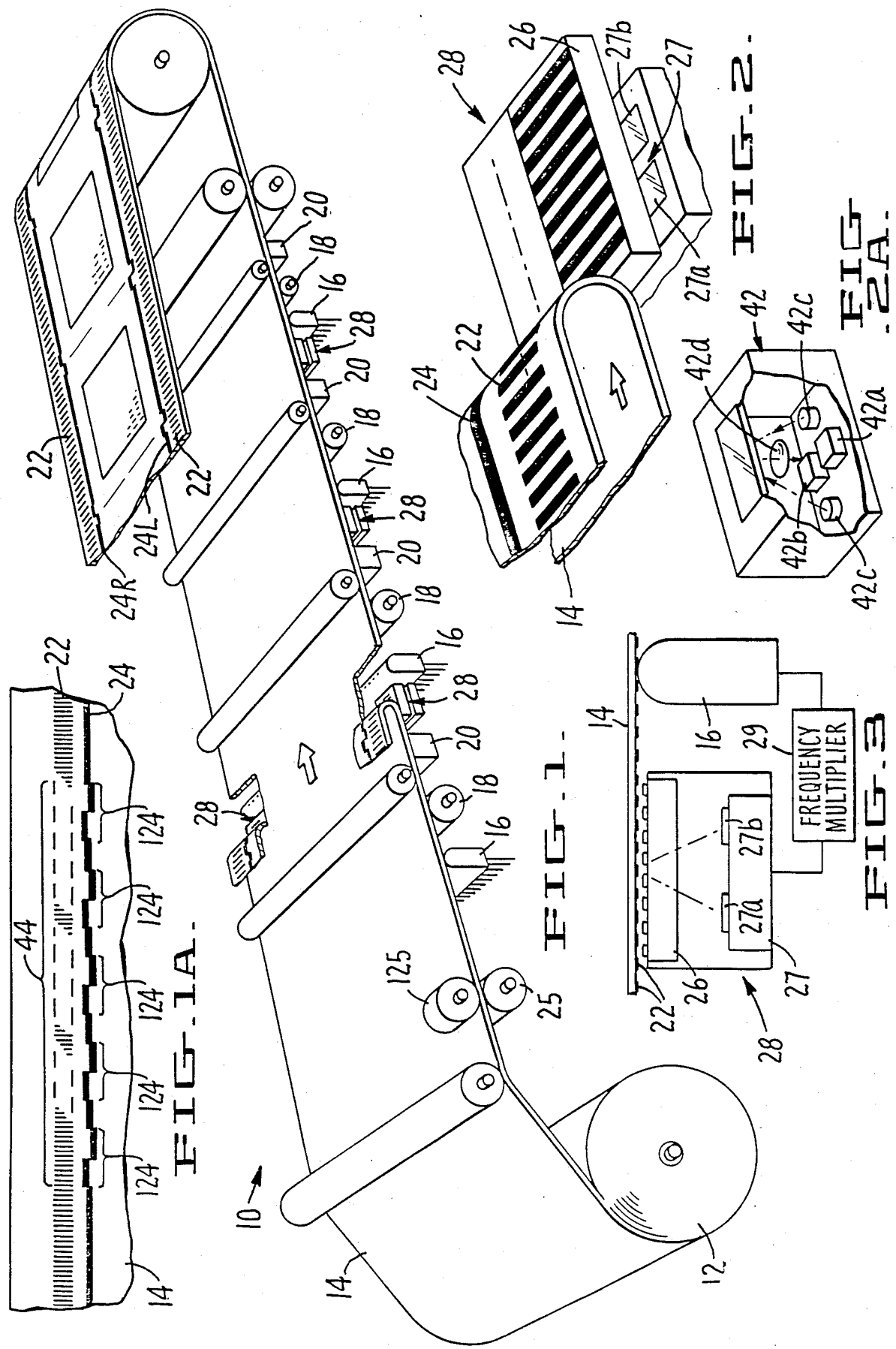

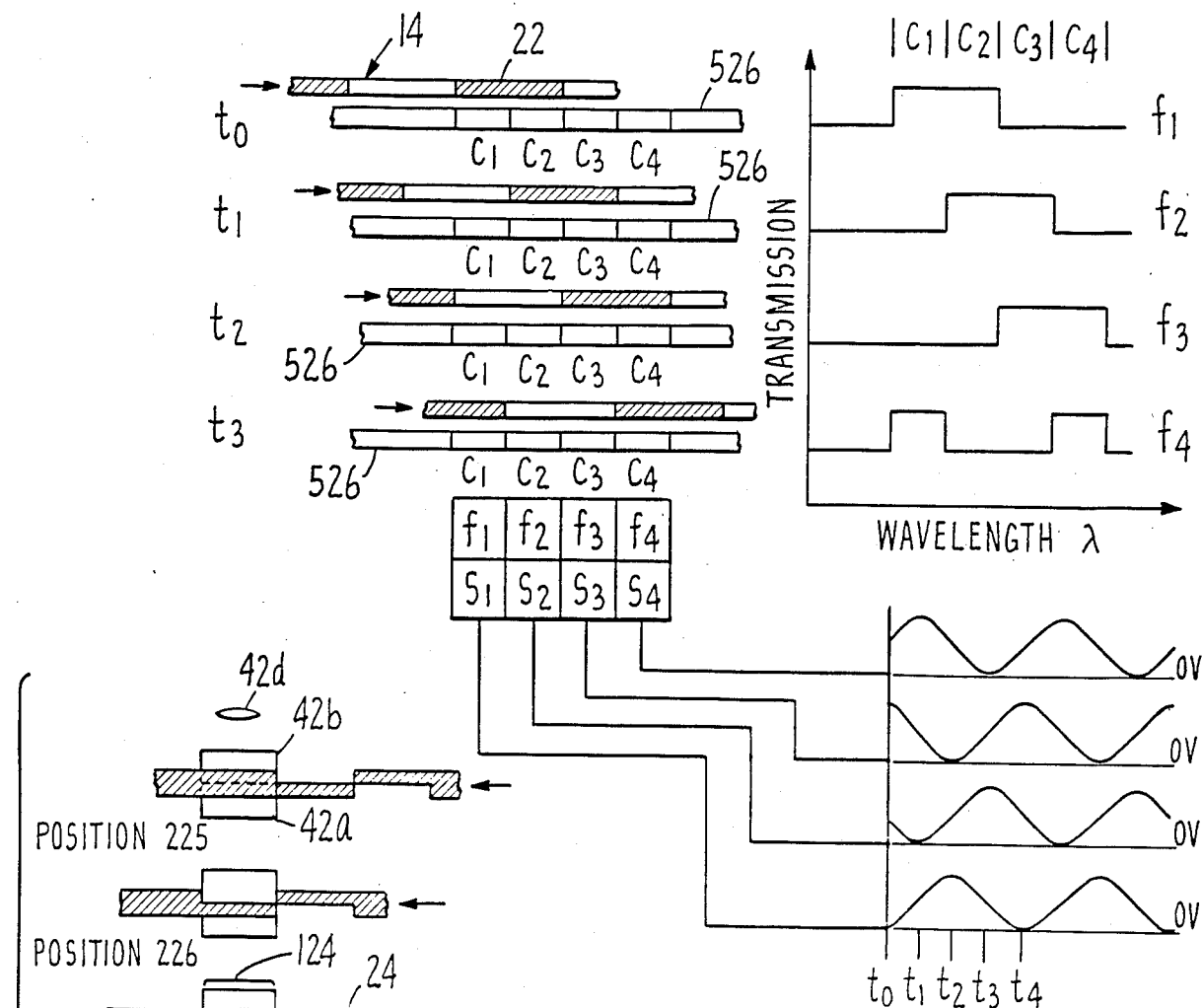
FIG. 11.
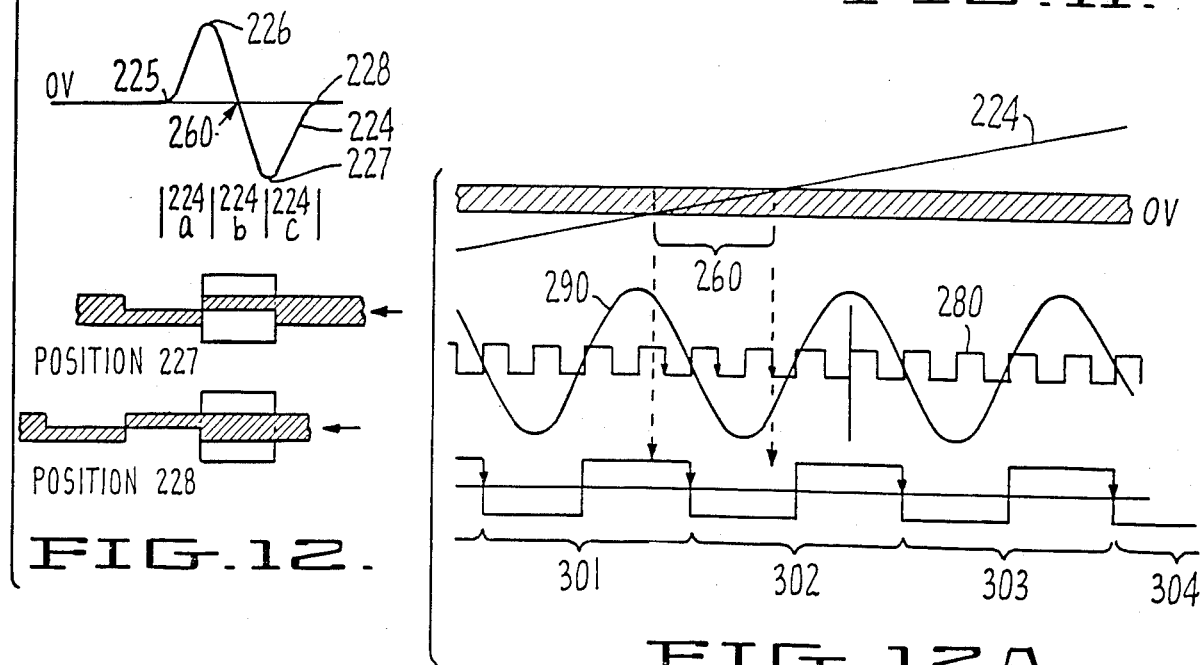
FIG. 12.
FIG. 12A.

FIG. 13A. TIMING REGISTRATION & SKEW SERVO

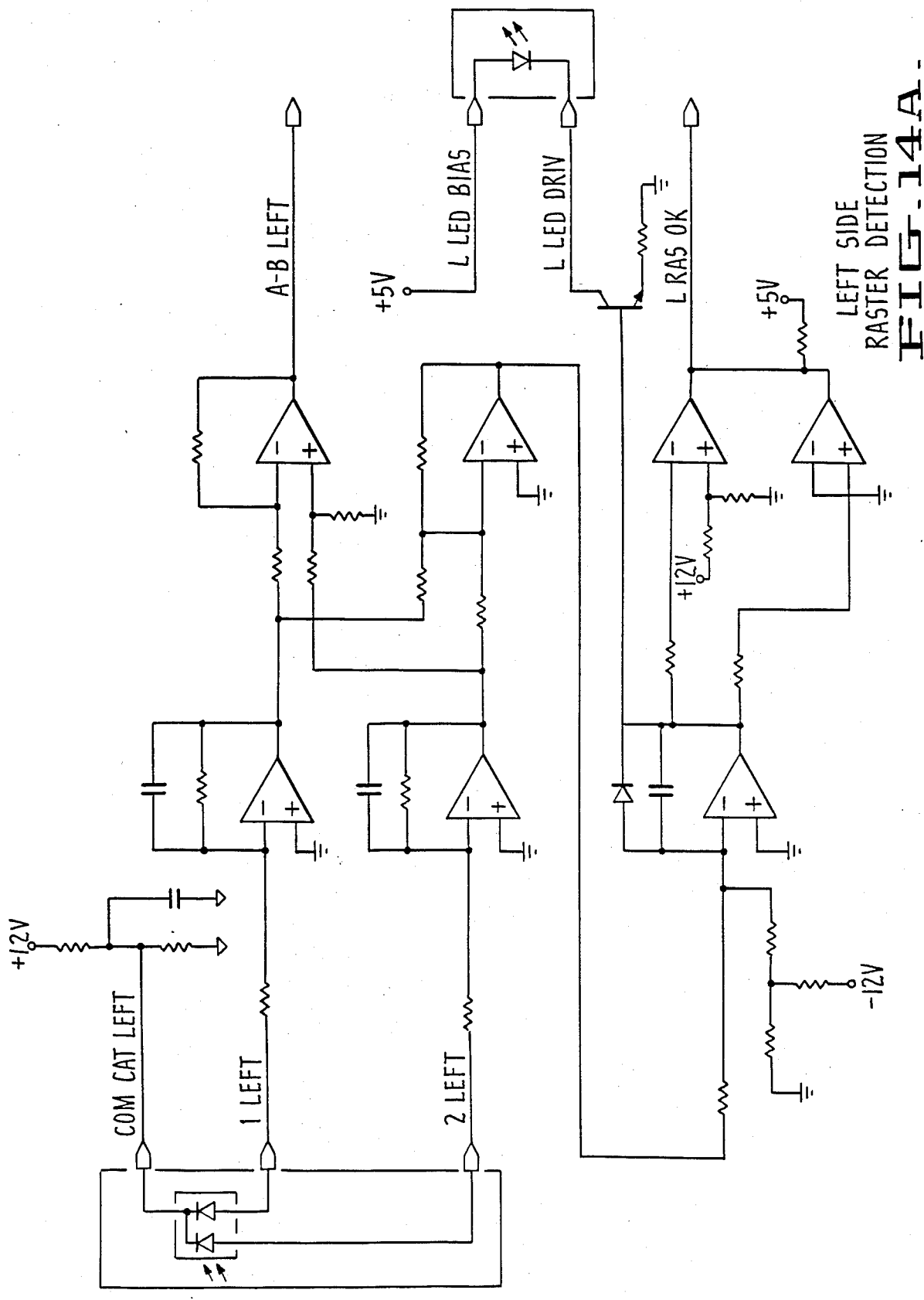
FIG. 14A. LEFT SIDE RASTER DETECTION

START OF PLOT SAMPLE & HOLD

RASTER SERVO ERROR AND DIRECTION

RASTER SERVO MOTOR DRIVE

4,808,832

REGISTRATION SYSTEM FOR A MOVING SUBSTRATE

This application is a continuation of Ser. No. 906,259, filed Sept. 11, 1986 and now abandoned.

RELATED APPLICATION

U.S. Application Ser. No. 06/906258, filed Sept. 11, 1986, and entitled SYSTEM AND METHOD FOR INITIATING START-OF-PLOT IN A PRINTING SYSTEM and assigned to the assignee herein.

BACKGROUND OF THE INVENTION

1. Technical Field

The present invention relates to registration systems and, in particular, to a system and method for providing accurate registration between a printed image and previously printed images on a moving substrate.

2. Discussion of the Prior Art

Systems for controlling the relative positions of a moving substrate and an element or elements which operate on the moving substrate have been in use for some time. Control systems of this type typically use marks or indicia which are printed on the substrate material at regular intervals. These marks are scanned by a sensor as the substrate is fed past the operating element. When a mark passes the sensor in such a manner as to produce a signal indicative of an error in registration between the mark and the operating element, the sensor, in conjunction with control circuitry, generates a correction signal and an adjustment is made in the registration.

As an early example of a control system of this type, U.S. Pat. No. 2,250,209 issued July 22, 1941 to Shoults et al., discloses a control system for a stamp perforating machine. In the Shoults system, a perforating element operates on a continuous length of moving postage stamps. The Shoults control system includes a photocell which monitors marks formed on the length of stamps and produces a corresponding signal. A second photocell produces a second signal representative of the position of the perforating element. A motor which is responsive to variations in the two signals corrects the relative positions of the stamps and the perforating element.

In a later example, U.S. Pat. No. 3,781,490, issued Dec. 25, 1973 to Phillips, discloses a reel-to-reel magnetic tape transport system. The tape carries a number of laterally spaced data track groups and prerecorded reference tracks. A control transducer senses the reference tracks and provides an output signal indicative of increments of tape movement. This information is used to derive an output signal indicative of tape speed, i.e., displacement per unit time. The control transducer also provides a signal indicative of the lateral position of the tape. The control transducer includes a tension transducer which provides an output signal indicative of the tape tension. The lateral tape position signal controls the lateral position of a data processing head. The tape speed signal and tape tension signal jointly control two reel drive motors to maintain a desired tape speed, i.e., a desired incremental tape distance per unit time, and a desired tape tension.

More recently, U.S. Pat. No. 4,569,584, issued Feb. 11, 1986 to St. John et al., discloses a color electrographic recording device which produces a composite color image on a recording medium. The St. John printer transports the recording medium along a predetermined path. A print station in the transport path of the medium includes a recording head with an electrode which forms an electrostatic latent image on the medium. A number of developing stations in the transport path develop the latent image into a corresponding visible component image of a respective color.

The registration system disclosed in the St. John patent utilizes a series of solid, spaced-apart tracking marks which are printed on the print medium adjacent both of its edges. The tracking marks are printed to have a known, constant number of print lines between adjacent marks; the constant number of print lines is representative of a given constant value. The tracking marks are observed electro-optically as the print medium moves through the device. The signals generated by the photosensors in conjunction with appropriate electronics are used to determine whether the value obtained from the photosensor observation, relating to the spacing between adjacent tracking marks, is the same or different from the given constant value. Any differences between the observed value and the given constant value are processed to form an error sample representative of the differences. A number of these error samples are then averaged to produce an error correction signal which corresponds to an average of the physical longitudinal shrinkage or expansion of the print medium that has occurred between the time the device printed the timing marks and the later time that the marks are observed. The error correction signal is utilized to prevent image misalignment.

A deficiency of the St. John registration technique lies in the fact that the actual correction to registration is not applied at the precise point on the medium from which the correction signal was generated. Rather, because the correction signal is based on an average of signals taken over a length of the medium, the registration correction is applied at a point on the medium removed from the physical source of the correction signal.

According to the St. John et al. teaching, an optomechanical encoder provides a series of pulses where each pulse represents an incremental distance of print medium movement. Control circuitry is provided to count the number of encoder pulses generated. To discern dimensional changes in the longitudinal direction, the control circuitry counts the number of encoder pulses occurring between adjacent printed tracking marks. As the pulse sensor observes movement of the print medium from one tracking mark to the next, the number of pulses observed between the two tracking marks will be indicative of either no dimensional change, a shrinkage of the print medium, or a stretch or expansion of the print medium. Since, as discussed above, there is a given constant value of encoder pulses associated with the longitudinal distance between tracking marks when no dimensional change has occurred in the longitudinal direction, if the print medium has stretched, there will be an increase in the number of observed encoder pulses above the constant value between the tracking marks. Conversely, if the print medium has shrunk in the longitudinal direction, there will be a decrease in the number of observed encoder pulses below the constant value between the tracking marks. These pulse counts above and below the constant value are termed samples.

To remove any noise associated with a sample signal, a number of samples are averaged and a registration correction is made based on the resulting average. This is accomplished mathematically by taking a running average over the sample group, i.e., the most current sample is added to the sample group and the oldest sample in the sample group is dropped out. Thus, the St. John device produces a running average registration correction signal utilizing measurements taken over a series of consecutive tracking marks. Therefore, the correction in registration provided by the St. John device is always "running behind" the physical source of the correction signal by the number of tracking mark intervals used to generate the correction signal.

SUMMARY

The present invention provides a registration system for maintaining accurate correspondence between a printed image on a moving substrate and the action of an operating element with respect to the printed image. The system of the present invention applies a required registration correction at the point on the substrate from which an error signal is derived.

The preferred embodiment of the registration system of the present invention includes a series of spaced-apart timing marks formed on the substrate. A comparison optical device, which comprises a series of lines and spaces formed on a transparent medium, is positioned such that the timing marks pass in optical alignment with the comparison optical device when the substrate is moving. An optical sensing device is positioned to detect light reflected from the substrate through the comparison optical device. The sensing device responds to the reflected light by generating a signal which is processed by appropriate electronic circuitry and provided to the operating element to activate the operating element in correspondence to the passage of the timing marks so as to accurately register the printing of a new image with respect to previously printed images.

Thus, it is an object of the present invention to provide a real time registration system for a moving substrate.

It is also an object of the present invention to provide accurate registration for a multi-color imaging system at high resolution and low cost.

These and other objects and advantages of the present invention will become apparent and be appreciated by referring to the following detailed description of the invention considered in conjunction with the accompanying drawings.

DESCRIPTION OF THE DRAWINGS

FIG. 1 is a schematic drawing illustrating a perspective view of an electrostatic printer incorporating the registration system of the present invention;

FIG. 1A is a schematic drawing illustrating a machine initialization pattern formed as part of a solid lateral tracking line and used for skew adjustment.

FIG. 2 is a schematic drawing illustrating a comparison optical device utilized in accordance with the present invention together with the printed timing marks and sensors used for detecting substrate movement;

FIG. 2A is a schematic drawing illustrating a partially cut-away perspective view of a split detector used for lateral registration of the substrate and for start-of-plot detection in accordance with the present invention;

FIG. 3 is a schematic block diagram illustrating a registration system in accordance with the present invention;

FIG. 11 is a schematic drawing illustrating the generation of four waveforms utilizing the four-color comparison optical device shown in FIG. 10;

FIG. 12 is a schematic drawing illustrating the start-of-plot signal generated by a split detector in response to the passage of the start-of-plot portion of the lateral tracking lines;

FIG. 12A is a schematic diagram illustrating the relationship between start-of-plot signal crossover and the write head firing signal;

FIGS. 13A and 13B combine to form a schematic diagram illustrating a circuit utilized to generate a write head firing signal from the four waveforms generated by the four-section comparison optical devices shown in FIG. 8;

FIGS. 13A, 13B and 13C combine to form a schematic diagram illustrating a circuit utilized to generate a skew correction signal from the output of two comparison optical devices according to the technique shown in FIG. 4;

FIGS. 14A, 14C and 14D combine to form a schematic diagram illustrating a circuit utilized to generate a lateral correction signal based on observation of the solid tracking lines; and FIGS. 14A and 14B combine to form a schematic diagram illustrating a circuit utilized to generate a start-of-plot signal from detection of the start-of-plot pattern formed as part of the tracking line.

DETAILED DESCRIPTION OF A PREFERRED EMBODIMENT

Figure 4:
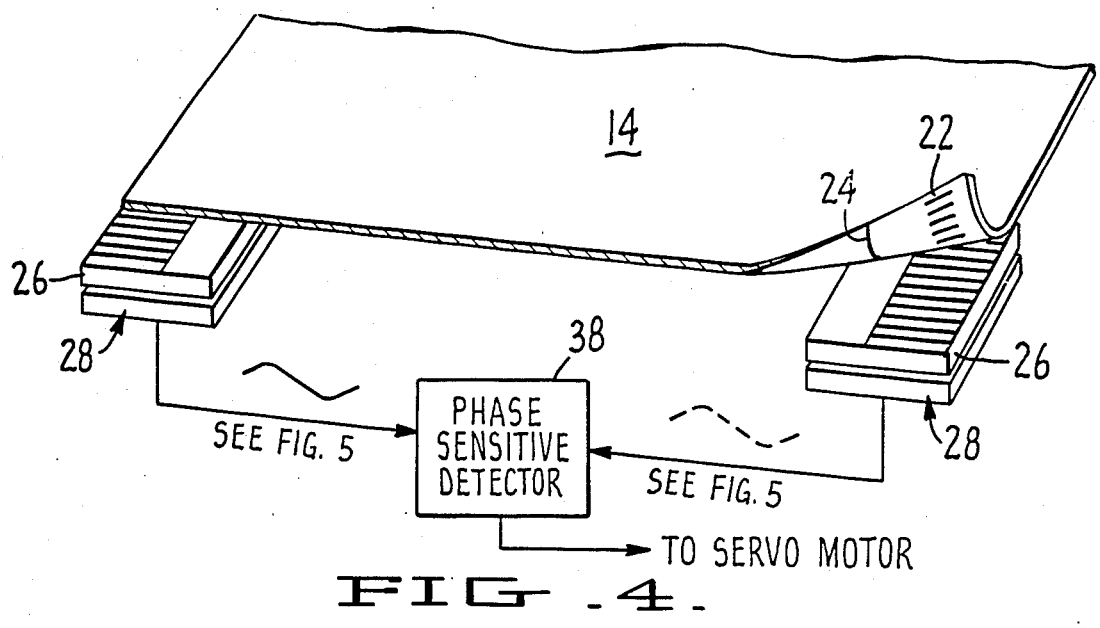
FIG. 4 is a schematic drawing illustrating a perspective view of the tracking line and sensors utilized for skew adjustment of the substrate in accordance with the present invention.
Figure 5:
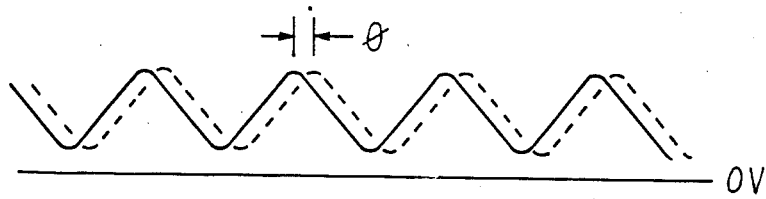
FIG. 5 is a schematic diagram illustrating two signals generated by a pair of associated comparison optical devices for skew adjustment of the substrate, in the presence of skew, in accordance with the technique shown in FIG. 4.

Referring to FIG. 1, electrostatic printer 10 includes supply roller 12 which feeds print medium substrate 14 past a series of print stations.

In the embodiment illustrated in FIG. 1, electrostatic printer 10 includes four print stations, each including a write head 16, toner roller 18 and drying/fixing station 20. In addition, each print station except the first includes a pair of sensor assemblies 28 which includes comparison optical device 26, reflective sensor 27 and lateral detector 42, for effecting print image registraton in accordance with the present invention.

Each write head 16 includes an array of conductive elements or wire stylii arranged in a linear configuration which is well known in the art. The stylii of each write head 16 (except the first, which responds to encoder 125) deposit charges on the surface of moving substrate 14 in a predetermined configuration according to instructions provided by an associated conventional computer system (not shown) and in response to a write head firing signal generated by the registration system of the present invention, as described hereinbelow. The substrate 14 then moves past toner station 18 where it picks up charged ink particles which are fused to the substrate at drying/fixing station 20.

In the embodiment illustrated in FIG. 1, each print station prints a different primary color in registration with any colors printed by previous print stations.

As shown in FIGS. 1 and 1A, a series of equally spaced opaque timing marks 22 is printed by the first print station at each edge of substrate 14 on its print surface in response to signals from encoder 125. Encoder 125 produces a signal that is related to the movement of substrate 14. This signal is delivered to the electronics that control the first write head 16 of printer 10 so that it may print timing marks 22 and other print data.

Timing marks 22 are printed on substrate 14 such that if timing marks 22 are printed to be one print line wide, then one print line is skipped between adjacent timing marks; if timing marks 22 are printed to be two print lines wide, then two print lines are skipped between adjacent timing marks 22; and so on. This spacing configuration is referred to as "one-on, one-off", or "two-on, two-off", as the case may be. In the preferred embodiment of the invention, timing marks 22 are printed in a "one-on, three-off" configuration with timing marks 22 on opposite edges of substrate 14 being in lateral correspondence. As described below, because the actual size of the printed dots is 0.004" whereas the distance between four dots is 0.01", this configuration is effectively "two-on, two-off".

As will be explained in detail below, timing marks 22 are utilized to both provide a firing signal to write heads 16 and to detect changes in the skew of moving substrate 14.

As is best shown in FIGS. 2 and 3, the generation of a write head firing signal is accomplished through use of timing marks 22 on one edge of the substrate 14 in conjunction with comparison optical device 26.

In the preferred embodiment, comparison optical device 26 has matching opaque lines and spaces formed on the upper surface of a transparent substrate. Such a device is commonly known as a Ronchi Ruling. The spacing configuration of the lines and spaces of comparison optical device 26 corresponds substantially to the configuration of timing marks 22. In this case, there is a correspondence of "two-on, two-off", as modified by the print dot size (i.e., as explained above, the printed dot size is larger than the pitch of dot spacing and, therefore, the white space between the printed marks is narrower.) As shown in FIG. 1, in the preferred embodiment, one sensor assembly 28 is mounted upstream to all but the first write head 16 near each edge of substrate 14, in virtual contact with both substrate 14 and its associated write head 16, such that timing marks 22 pass in optical alignment with comparison optical device 26 when substrate 14 is moving through printer 10.

As shown in FIGS. 2 and 3, in the preferred embodiment, reflective sensor 27, such as a unit manufactured by TRW Corporation and having identifying number OPB706A, projects light from LED light source 27a onto substrate 14 through comparison optical device 26 and senses light reflected from substrate 14 through comparison optical device 26 at silicon phototransistor 27b. (It should be noted that while use of LED light source 27a just described is the preferred embodiment, it is possible, and within the scope of the present invention, to use other light sources or to merely sense the ambient light contrast resulting from the passage of timing marks 22 with respect to comparison optical device 26.)

When the opaque lines of comparison optical device 26 are in complete alignment with timing marks 22 on substrate 14, light is reflected from substrate 14 from the spaces between timing marks 22. In this position, the output signal from phototransistor 27b is at its maximum. Conversely, when the opaque lines of comparison optical device 26 are completely out-of-phase with timing marks 22, there is maximum absorption of light by timing marks 22 of substrate 14 and the opaque lines of comparison optical device 26. In this position, the output signal from phototransistor 27b is at its minimum. Thus, the intensity of light reflected from substrate 14 varies from maximum reflection to minimum reflection in the time it takes for timing marks 22 to move from being completely in-phase with the opaque lines of comparison optical device 26 to being completely out-of-phase. Therefore, the frequency of the output signal generated by phototransistor 27b corresponds directly to movement of substrate 14, where the cycle corresponds to a distance equal to one timing mark cycle. Based on this correspondence, the output of phototransistor 27b may be used, in conjunction with appropriate circuitry as described below, to provide a firing signal to its associated write head 16 in direct correspondence to movement of substrate 14 and, therefore, to the image printed thereon.

As stated above, in the described embodiment, timing marks 22 are printed in "one-on, three-off" configuration. This means that there are four print lines associated with each timing mark, one for the timing mark 22 itself and three for the space following the timing mark 22. Since, however, the print dot size is 4 mils diameter and the print lines are spaced 2.5 mils apart, the actual timing mark configuration is a series of 4 mil wide timing marks 22 separated by 6 mil wide spaces, effectively a "two-on, two-off" configuration. Based on this effective configuration, as shown in FIG. 3, the output signal of phototransistor 27b is provided to frequency multiplier circuitry 29 which increases the frequency of the phototransistor 27b output by a factor of four so that the firing signal provided to write head 16 activates write head 16 to print on a line-by-line basis.

Figure 6:
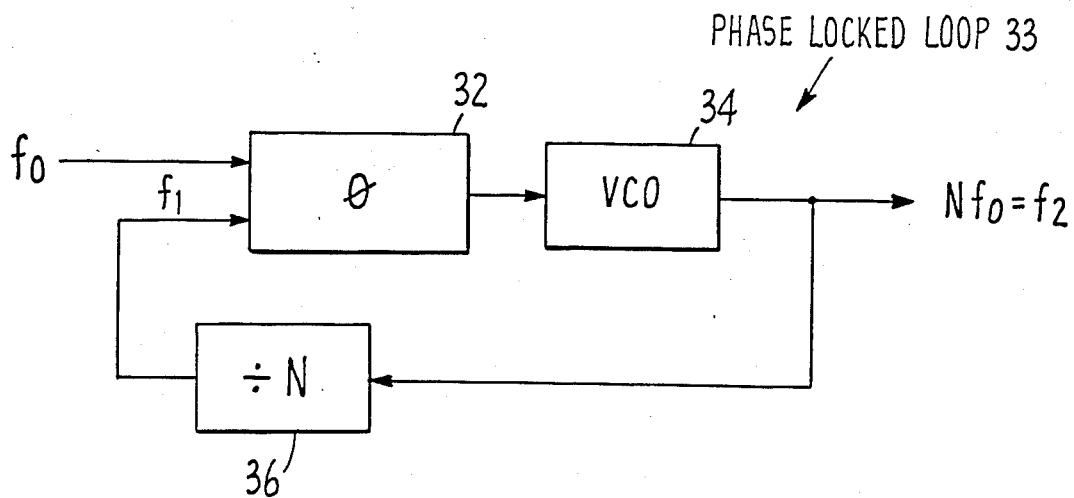
FIG. 6 is a schematic block diagram illustrating a phase locked loop used for adjusting the frequency of a write head firing signal in accordance with the present invention.

FIG. 6 shows a conventional phase locked loop (PLL) 33 which provides a desired frequency multiplication. PLL 33 includes phase comparator 32, voltage controlled oscillator (VCO) 34 and frequency-divide circuit 36. PLL 33 drives frequency $f_1$ to be in phase with frequency $f_0$, the output signal from reflective sensor 27 in conjunction with comparison optical device 26 and timing marks 22. This is accomplished by driving VCO 34 to be N times frequency $f_0$. The frequency $f_2$ (where $f_2=Nf_0$) of the signal generated by VCO 34 is modified by frequency-divide circuit 36 which outputs frequency $f_1$. This frequency $f_1$ is driven by phase comparator 32 to be in-phase with frequency $f_0$. Thus, PLL 33 produces firing signal $f_2$ which is N times $f_0$ and in phase with $f_0$. As stated above, in this embodiment, N equals 4.

The use of a phase locked loop frequency adjustment, as described above, works well in the absence of electrical noise. However, if there are noise sources present, then a phase locked loop may have trouble tracking the signal from reflective sensor 27. Electrical noise can come from various sources. One potential source would be uneven substrate 14 movement past the comparison optical device 26. Uneven substrate 14 movement could have various causes. Slow changes in movement would result from the diameter of the substrate roll being out-of-round. Fast changes could come from gear tooth inaccuracies in the substrate 15 drive motor, toner roller eccentricities or general machine vibrations. Whereas the PLL circuit described above can handle low frequency noise sources, it cannot respond adequately to high frequency noise such as the fast changes mentioned above. The result is that PLL 33 may go into error and, since output $f_2$ of PLL 33 is the firing signal that controls the printing of each line on substrate 14, print registration is compromised.

Two alternative methods of frequency multiplication may be used to produce the required write head firing signals. One alternative is to use a "one-on, one-off" timing mark configuration. The output signal frequency of reflective sensor 27 would then be one half the print line clock rate, but each cycle would have two zero crossings which could be used to create a signal that activates write head 16 to print a line at the proper time.

Unfortunately, in the typical electrostatic printer of the type described above, the size of the stylii used and the resulting printed dot size cause an erosion of the unprinted space between the every-other-line of printed timing marks. For example, as described above, if the pitch of the line-to-line printing is 2.5 mils, then in a "one-on, one-off" configuration, the 2.5 mil space between timing marks 22 is reduced to about 1.0 mil because, while the centers of adjacent timing marks are 5.0 mils apart, the dots forming the marks are 4.0 mils in diameter. This situation significantly reduces the contrast ratio of the resulting comparison optical device 26 light signal and makes a "one-on, one-off" timing mark configuration less than desirable. A "one-on, one-off" configuration also makes initial skew adjustment more difficult.

It should be noted, however, that if special wires, or even thin shim material, are placed in the first print station where timing marks 22 are produced, then a "one-on, one-off" configuration could be utilized with a resultant simplification of the system.

In the absence of the ability to use a "one-on, one-off" timing mark configuration, the next best configuration is the effective "two-on, two-off" configuration described above. However, as discussed above, the use of a "two-on, two-off" sequence requires production of a 4× frequency multiplication and as discussed above, a PLL has problems in this application. However, an alternative technique for producing a 4× multiplication is through the use of "quadrature."

In quadrature, two signals are created that have a 90° phase relationship. As described below, through the use of these two signals, a 4× multiplication of the frequency of the output of reflective sensor 27 can be effected. This is a direct process that does not involve a PLL and, therefore, is not affected by moderate variations in the speed of substrate 14.

Figure 7:
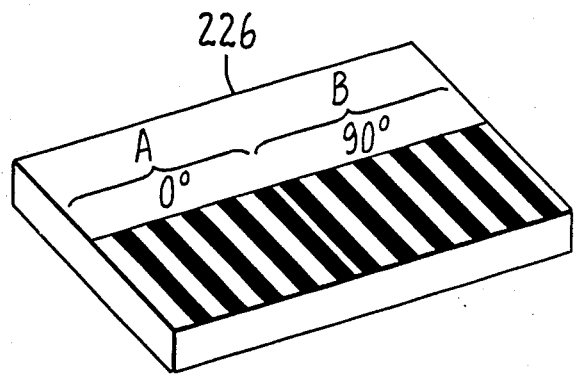
FIG. 7 is a schematic drawing illustrating a perspective view of a two-section comparison optical device utilized to produce quadrature in accordance with present invention.

To produce quadrature according to the present invention, a comparison optical device having two distinct sections is substituted for the single-section comparison optical device 26 described above. As shown in FIG. 7, the two distinct comparison optical device sections A and B have exactly the same line spacing and line width as the previously-described comparison optical device 26 and, in fact, are identical gratings. The only difference in the gratings is their placement; they are placed in series so that their phase relationship is 90° with respect to each other. To accommodate the two distinct sections A and B, two reflective sensors, one for each section, are required to generate a dual output signal. The two output signals are provided to appropriate conventional circuitry, shown in FIG. 13B and described below, to produce the required frequency multiplication.

Figure 8:
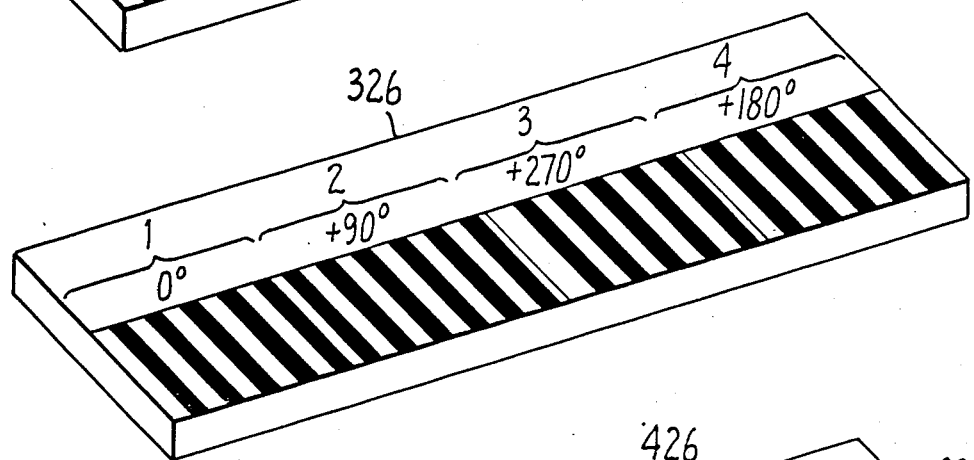
FIG. 8 is a schematic drawing illustrating a perspective view of a four-section comparison optical device utilized to produce four-signal quadrature in accordance with the present invention.

A further improvement of the basic 2-signal quadrature resulting from the two-section comparison optical device arrangement described above in conjunction with FIG. 7, and the preferred embodiment of the present invention, is 4-signal quadrature. Referring to FIG. 8, four separate output signals are generated by a comparison optical device having four distinct sections 1-4 of the type described above and, in the preferred embodiment, being positioned with respect to each other so that their sequential phase relationship is 0°, 90°, 270° and 180°, respectively. The four resulting signals represent sine, cosine, −cosine and −sine. These four signals are used in conjunction with appropriate conventional circuitry to generate the required frequency multiplication so as to produce a write head firing signal that is independent of substrate background "whiteness."

The four distinct comparison optical device sections 1-4 shown schematically in FIG. 8 have the same line width and line spacing, but, as stated above, each section is phase shifted with respect to the others. The sections 1-4 can be described in terms of phase angle where 360° is the distance from the side of one line in a section to the same side of an adjacent line in the same section. Thus, in the preferred embodiment section 1 is 0° (sine), section 2 is +90° (cosine), section 3 is +270° (−cosine) and section 4 is +180° (−sine). The four sections can be arranged in any order, however, and still perform in accordance with the present invention.

Each of the four sections 1-4 shown in FIG. 8 has an individual LED/phototransistor pair associated with it.

Figure 8A:
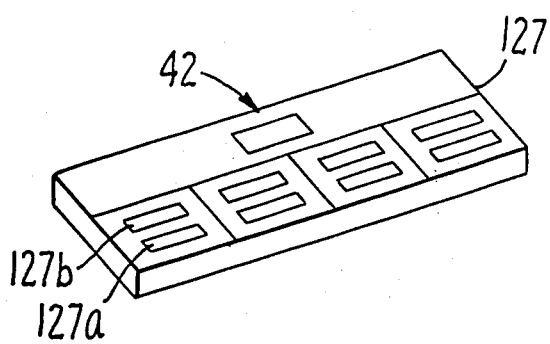
FIG. 8A is a schematic drawing illustrating a perspective view of a sensing assembly utilized in conjunction with the four-section comparison optical device shown in FIG. 8.

According to a preferred embodiment of the invention, rather than the LED/phototransistor pair being arranged sequentially as shown in FIGS. 2 and 3, LED 127a and phototransistor 127b are mounted in a side-by-side configuration as shown in FIG. 8A. This side-by-side configuration substantially eliminates any "shawdow" effect caused by deeply etched lines in the comparison optical device. LED 127a and phototransistor 127b can be purchased and mounted separately. LED 127a in the FIG. 8 embodiment is a TRW GaAlAs LED, Part No. OP268FA; phototransistor 127b is also a TRW product, Part No. OP508FA. LED 127a and phototransistor 127b are shielded by a piece of copper 127 which is grounded because of the proximity of these components to write head 16.

Thus, four output signals, representing sine, cosine, −cosine and −sine, are generated by the four-section comparison optical device. These four signals are provided to appropriate circuitry which generates a single firing signal for write head 16. An example of a circuit which can be used to generate the firing signal is provided by the combination of the circuitry shown in FIGS. 13A and 13B.

FIG. 13A shows circuitry for generating a sine output signal SINE from the signal generated by the first phototransistor 127b of the four-section comparison optical device. Identical circuitry is utilized to generate similar signals corresponding to the other three comparison optical device sections, i.e., cos, −cos and −sine. These four signals (SINE, MSINE, COS and MCOS) are then provided to circuitry as shown in FIG. 13B. As shown in FIG. 13B, the SINE and MSINE signals are provided to the "plus" and "minus" inputs of a difference amplifier. The COS and MCOS signals are similarly processed. The two resulting ground centered signals are then split and squared-up to form four 45° square wave signals SW1–SW4 which are delivered as inputs to an exclusive-OR tree. The exclusive-OR changes state with each transition of one of the four comparison optical device signals, thereby providing four write head FIRING SIGNAL outputs with the passage of each timing mark 22.

By utilizing circuitry of the type just described, any DC offset in the signal from the four-section comparison optical device is cancelled. A DC offset is always present since the opaque lines of the comparison optical device and opaque timing marks 22 are not completey absorbing and there is generally some scattered light present.

The aforedescribed method of using signals representing sine and −sine and cosing and −cosine can be used to partially cancel mottling of the substrate reflectivity. Since there are four comparison optical device sections and four separate reflective sensor pairs, the effect is limited mottling artifacts of size comparable to the distance between sine and −sine and cosine and −cosine detectors.

Figure 9:
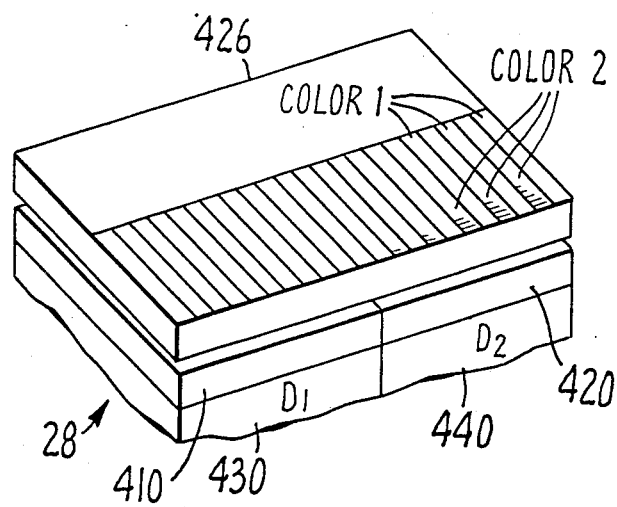
FIG. 9 is a schematic drawing illustrating a perspective view of a two-color comparison optical device and its associated sensing assembly utilized in accordance with the present invention.

A further improvement over use of a 4-signal quadrature comparison optical device uses a single comparison optical device where the distance between comparison optical device elements which produce the sine and cosine signals effectively disappears. In accordance with this concept, FIG. 9 shows a comparison optical device wherein instead of having alternate clear and opaque (black) stripes, alternating stripes of different colors are provided. Thus, both the sine and the cosine signals are generated from the same comparison optical device grating. If timing marks 22 are black, then as they move over each color on comparison optical device 426, the black timing marks 22 back up first one color and then the other. When the black timing marks back up one color, color is removed, since the light that passes through that color is not reflected. Therefore, as substrate 14 is moved, the black timing marks 22 on substrate 14 cause the reflected light that passes through colored comparison optical device 426 to change from color 1 to color 2 and then back again. Two reflective sensors 430 and 440 are positioned so that they collect the scattered light that reflects from substrate 14 through two-color comparison optical device 426. Sensor 430 has a color filter 410 for color 1 and sensor 440 has a colored filter 420 for color 2. Thus, each sensor generates a waveform which is 90° out of phase with the other sensor's waveform. This arrangement generates sine and cosine. The advantage of this technique is that the two signals come from the same location on the substrate and, thus, see the same substrate reflectivity characteristics. When the two signals are combined, any variations in the DC level of one signal will be the same in the other signal and therefore, the effects of substrate 14 mottling will diminish.

Figure 10:
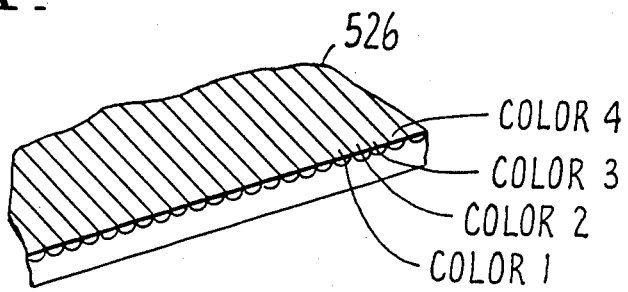
FIG. 10 is a schematic drawing illustrating a perspective view of a four-color comparison optical device utilized to produce four-signal quadrature in accordance with the present invention.

The above-described "two-color" comparison optical device concept can be extended to quadrature as well. As shown in FIG. 10, for quadrature, four stripes of different colors, with a spacing of one half the spacing of timing marks 22, are used in a single comparison optical device 526.

Referring to FIG. 11, in a manner similar to two-color comparison optical device 426, four reflective sensors $f_1$–$f_4$ of the type described above are positioned so that each senses the light that reflects from substrate 14 through four-color comparison optical device 526. Sensor $s_1$ includes a color filter $f_1$ which passes two colors, C1 and C2; sensor $s_2$ includes a color filter $f_2$ which passes colors C2 and C3; sensor $s_3$ has a filter $f_3$ which passes colors C3 and C4; and sensor $s_4$ has a filter $f_4$ which passes colors C4 and C1. As substrate 14 moves over four-color comparison optical device 526, black timing marks 22 will back up different colors, resulting in 90° phased output signals from the four sensor $s_1$–$s_4$. As stated above, each of the color stripes C1–C4 are one half the width of the respective black timing marks 22.

For example, as shown in FIG. 11, at time $t_0$, the black timing mark backs up the color C1 and C2 stripes. Therefore, at time $t_0$, sensor $s_1$ senses low intensity reflection since substantially all light passing through the comparison optical device behind those two stripes is absorbed by timing mark 22. Similarly, at time $t_0$, sensor $s_2$ senses medium intensity light since low light is reflected through the color C2 stripe but high light is reflected through the color C3 stripe, which is backed by a "space"; sensor $s_3$ senses high intensity light because both the color C3 stripe and the color C4 stripe are backed by a "space"; and sensor $s_4$ senses medium intensity light because the color C4 stripe is backed by a "space" and the color C1 stripe is backed by a timing mark 22.

As substrate 14 moves from time $t_0$ through time $t_x$, the detectors sensors $s_1$–$s_4$ generate the 90° phased signals shown in FIG. 11. These waveforms can be used to generate a write head firing signal in the same manner as the signals derived from the four-section comparison optical device described above with respect to FIG. 8. The advantage of this four-color technique is that the firing signal can be derived from a single point on substrate 14.

Referring back to FIG. 4, the adjustment for skew in moving substrate 14 is based upon the signals generated by the two comparison optical devices 26 associated with each print station. The output of reflective sensor 27 associated with each comparison optical device 26 is processed by circuitry, described below, and provided to a conventional phase sensitive detector 38. Phase sensitive detector 38 generates an error signal which is based on the phase difference $\phi$ between the left and right sensor 27 outputs. The error signal drives a servo motor (not shown) which angulates the associated write head 16, to which sensor assemblies 28 are attached, to remove the skew error. Alternatively, the error signal could be used to steer substrate 14.

Figure 13C:
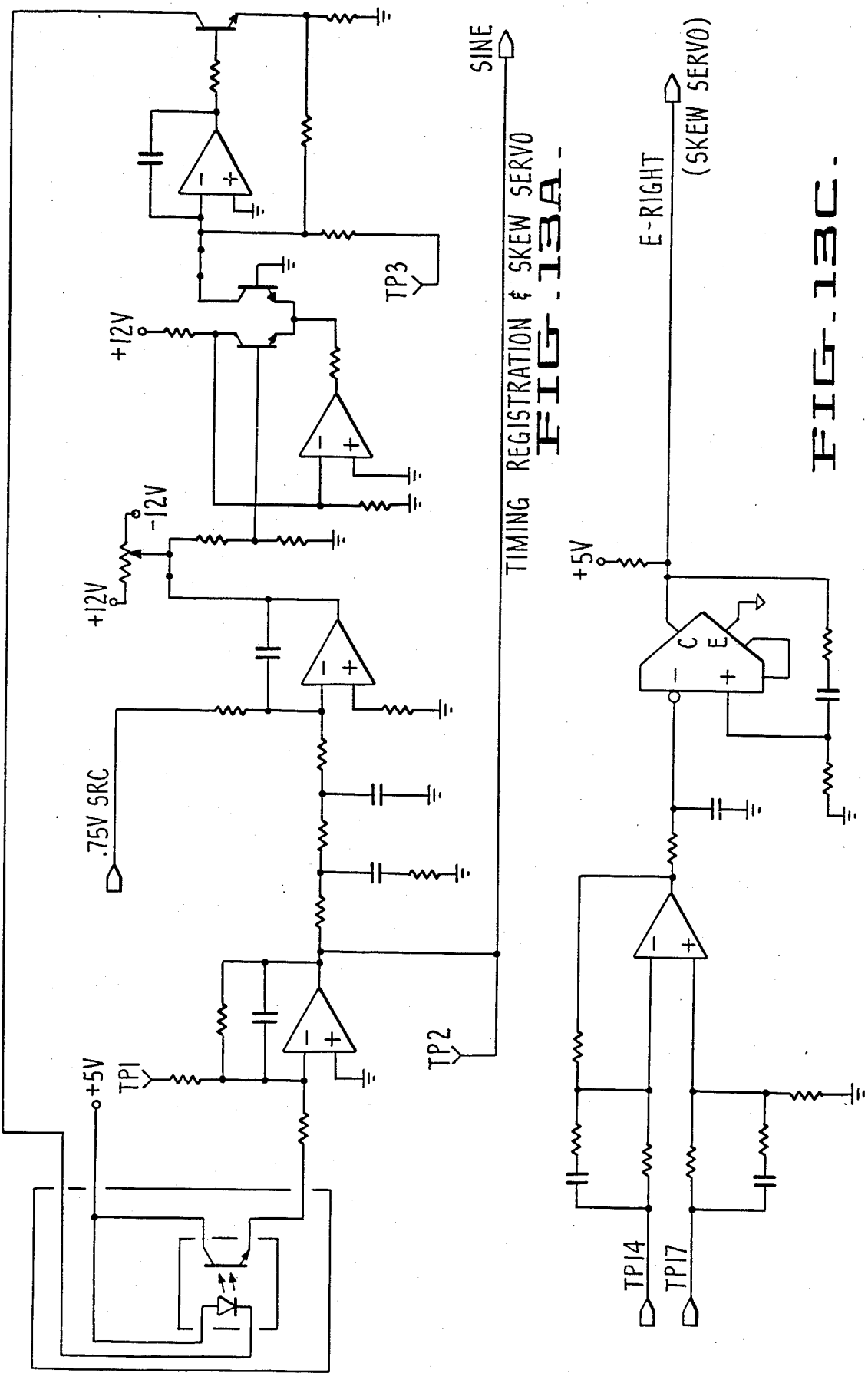
Figure 13B:
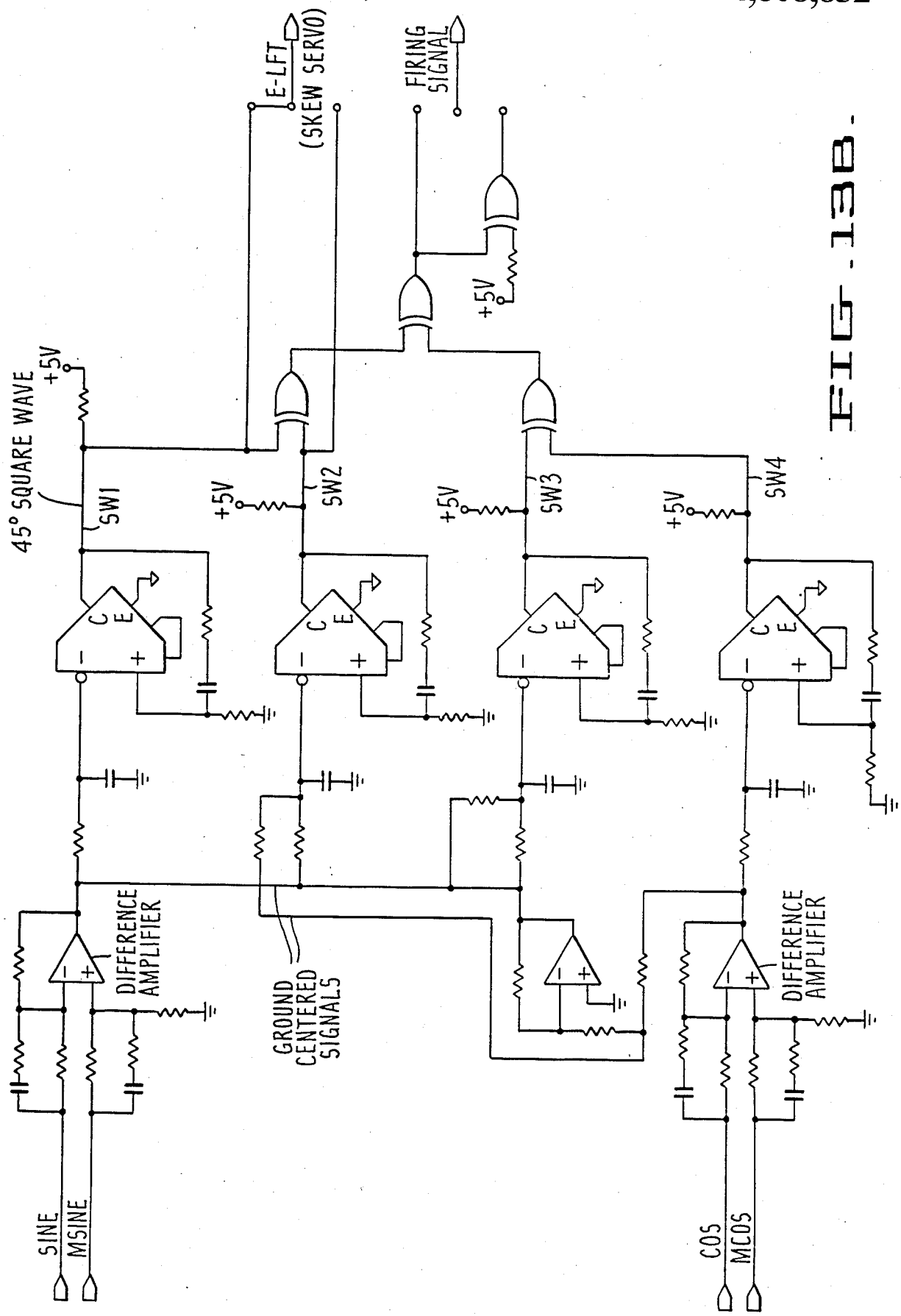

The circuitry for phase sensitive detector 38 is shown in the combination of FIGS. 13A-13C. As described above, the circuitry shown in FIGS. 13A and 13B generates four 45° square wave signals. As shown in FIG. 13B, one of these signals, designated E-LEFT, is used as the skew servo signal from the comparison optical device located at one side of substrate 14. A similar signal, E-RIGHT, is generated from the output of the comparison optical device 26 located on the opposite side of substrate 14 utilizing the circuitry shown in FIG. 13C (the circuit shown in FIG. 13C is less complex than that shown in FIGS. 13A and 13B because it does not include elements required to produce the write head firing signal). The two signals, E-LEFT and E-RIGHT, are then provided to a conventional phase sensitive detector, which based on the phase difference between signals E-LEFT and E-RIGHT, generates a correction signal that is applied to a servo motor to appropriately adjust the associated write head 16 on which is mounted sensor assembly 28. This movement of write head 16 also moves one of the comparison optical devices 26 which removes the skew error.

As shown in FIGS. 1 and 1A, solid lateral tracking lines 24 are formed on each side of substrate 14 adjacent timing marks 22. In the illustrated embodiment, tracking lines 24 shown inside timing marks 22, but they could be located outside timing marks 22 as a matter of choice. Solid tracking lines 24 are used in the conventional manner to maintain the correct lateral position of write heads 16. As best shown in FIG. 2A, a lateral detector 42 comprising split sensors 42a and 42b detects light reflected from the substrate 14 and the lateral tracking line 24 as illuminated by LEDs 42c to monitor the position of solid tracking lines 24 to maintain write heads 16 centered with respect to the previously printed image. In the preferred embodiment, balanced detectors which are insensitive to paper optical density variations are used. A lens 42d is used to image substrate 14 in a 1:1 magnification configuration.

FIG. 14A shows circuitry which amplifies the outputs of two split sensors 42a, 42b on one side of substrate 14 and takes their difference to arrive at a signals, A-B LEFT, which is representative of the position of solid tracking line 24 on that side of substrate 14 with respect to lateral detector 42. A corresponding signal, A-B RIGHT, is generated by lateral detector 42 located on the opposite side of substrate 14. Referring to FIG. 14C, the two signals A-B LEFT and A-B RIGHT are then processed to generate two signals, RAS ABS ERR and RAS RAW DIR, which are, respectively, respresentative of the value and the direction of the correction required, and are utilized to drive a raster connection servo motor to keep the associated write head 16 centered with respect to the previously printed image.

Referring back to FIG. 1, the solid tracking line 24 on each side of substrate 14 includes at least one Start-of-Plot mark 124 for each individual image plot that is printed. The Start-of-Plot mark 124 works in conjunction with the split sensors 42a and 42b. When line 24 passes over sensor assembly 28, part of which consists of lateral detector 42, the tracking line 24 is imaged into sensors 42a and 42b such that the solid line is imaged half on sensor 42a and half on sensor 42b. Sensors 42a and 42b are mounted optically close together and, in the preferred embodiment, form what is known in the art as a split detector, that is, two detectors formed by photolithography on the same substrate. A product such as Silicon Detector Corporation SD 113-24-21-021 will provide a device with two detectors that are each 0.1" long by 0.050" wide and separated by 0.004". The imaging system should be considered such that the width of the line 24 is somewhat less than the distance across the sensors 42a and 42b. In the case of SD113-21-21-021, the distance across both sensors is 0.1"; the width of line 24 is the preferred embodiment is 0.06".

In the preferred embodiment, the magnification of the imaging system is 1.0 and is provided by lens 42d which has a focal length of 8 mm and is placed 16 mm from substrate 14 and 16 mm from split sensors 42a and 42b. This allows 0.020" extra detector width on each side of line 24 to allow for system dynamic range. The Start-of-Plot mark 124 is defined as a section of line 24 where, for a space interval equal to at least the length of sensor 42a or 42b, nominally one half of the width of one side of the line 24 ceases to be printed and then, for a space interval equal to at least the length of split sensor 42a or 42b, the side of the line that ceased to be printed returns, coincident with a cession of printing on the other half of line 24.

In the preferred embodiment, Start-of-Plot mark 124 is formed by having the entire line 24 move first one half its width to one side and then a distance equal to its entire width to the opposite side, and then back again to the center. At the end of this space interval the entire width of the line 24 returns to its normal configuration and remains constant until the next Start-of-Polt mark 124 occurs. Other variations on this theme are possible. In general, a variation in reflected light effecting the two sensors 42a and 42b differentially and then reversing is the method used.

Start-of-Plot marks 124 on opposite sides of substrate 14 present mirror images of each other. That is, when SOP mark 124 on one side of substrate 14 moves toward the nearest edge of substrate 14, its corresponding SOP mark 124 on the other side of substrate 14 also moves toward its respective edge; similarly, when SOP mark 124 on one side of substrate 14 moves toward the center of substrate 14, its corresponding SOP mark 124 on the other side also moves toward the center. This mirror-image SOP mark configuration allows the raster correction servo motor to remain in operation during passage of SOP marks 124 since the two mirror-image SOP marks 124 from which the lateral correction signal is taken effectively cancel each other.

The effect of passage of the Start-of-Plot mark 124 over split sensors 42a and 42b is that alternately one and then the other sensor 42a, 42b "sees" a much higher light level resulting from an increase in the percent of unprinted pattern being imaged on it. This causes a signal 224 to be generated as shown in FIG. 12A. As the image of Start-of-Plot mark 124 starts to pass over sensors 42a and 42b, the outputs of the two sensors becomes unbalanced and give rise to signal 224a. When the image of Start-of-Plot is positioned so that the image of Start-of-Plot mark 124 is at a position 226 in FIG. 12, signal 224 is at its maximum unbalanced positive voltage 226. As the image further moves to position 227, signal 224 switches to its maximum unbalanced negative voltage 227. In doing so, it passes rapidly through zero voltage 260 where the image of Start-of-Plot mark 124 produces equal signals out from sensors 42a and 42b. As the image further moves to position 228, sensors 42a and 42b again return to a balanced condition. This signal pattern serves to generate a unique indication of Start-of-Plot.

As shown in FIG. 12A, while the Start-of-Plot signal is unique and well defined, the zero crossover 260 will have noise on it which comes from both electrical noise as well as noise caused by printing errors such as flares or dropouts. As such, this signal is not sufficient to clearly identify a particular print line. It is, however, well defined with respect to one timing mark interval such as those designated 301, 302, 303, etc. in FIG. 12A. The noise band 260 of Start-of-Plot signal 224 can be placed in a unique timing mark interval such as 302 either by physically adjusting the sensor assembly 28 or by electrically delaying the zero crossing. Since, as described in detail above, the timing mark signal 300 is phase locked to the write head firing signal 280, either through a phase lock loop or through a quadrature multiplication circuit, the zero crossover 260 that uniquely determines a timing mark interval can also uniquely determine a particular print line. This is accomplished through use of appropriate conventional circuitry of the type shown in FIG. 15.

As shown in FIG. 1A, series of Start-of-Plot marks 124 is used to prepare the printer 10 for plotting. This is accomplished by comparing the time interval between the Start-of-Plot transition on opposite sides of substrate 14. The time difference between the two signals is indicative of an initial gross skew error present between the previously printed pattern and the write head associated with the sensor detecting the Start-of-Plot transitions. The time difference, either positive or negative, is used to drive the skew servo to correct for the gross skew error. Once the gross error has been corrected, other circuitry is called upon to maintain proper fine skew based upon the phase of left and right timing mark signals, as described above.

Figure 14B:
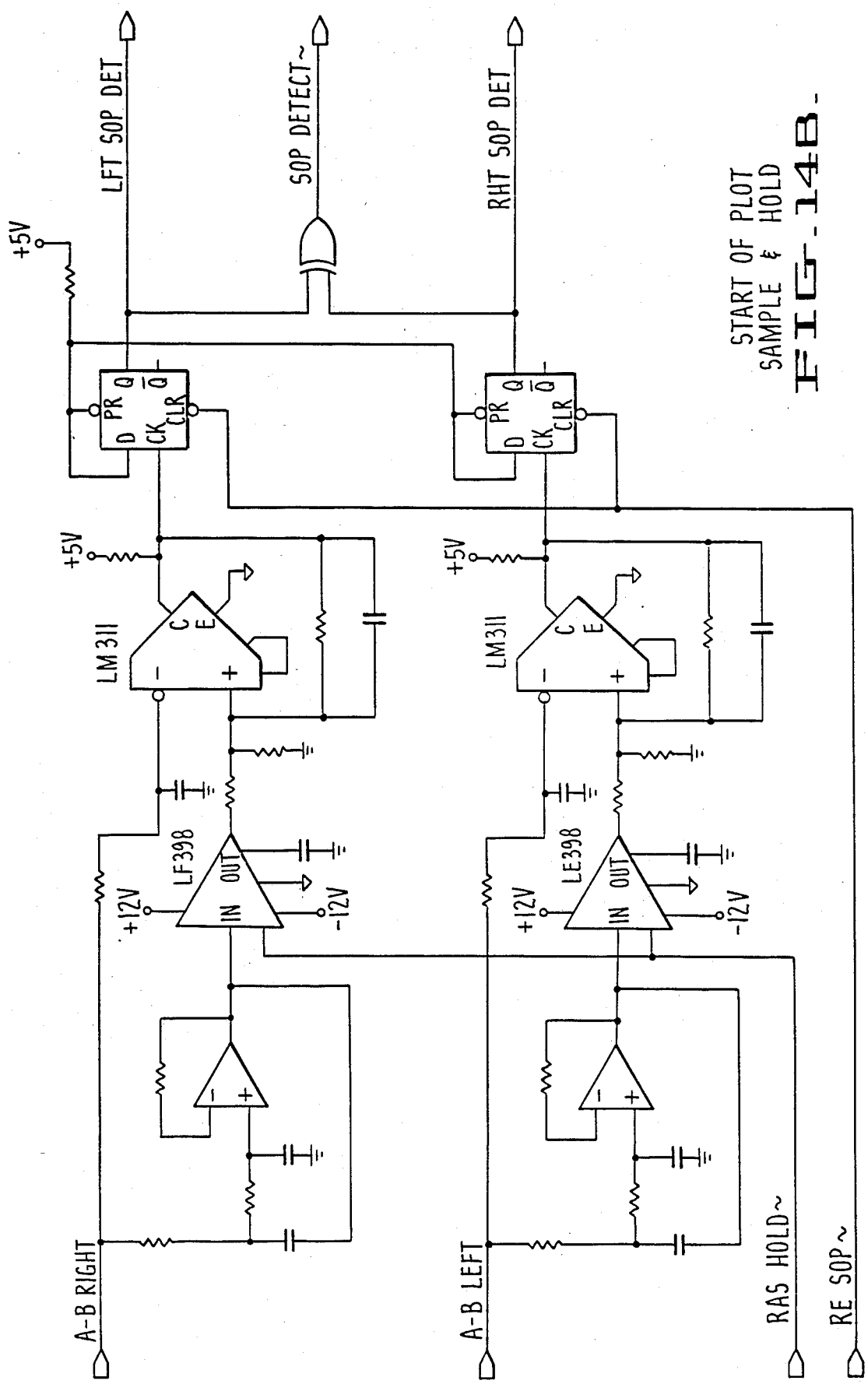
Figure 14C:
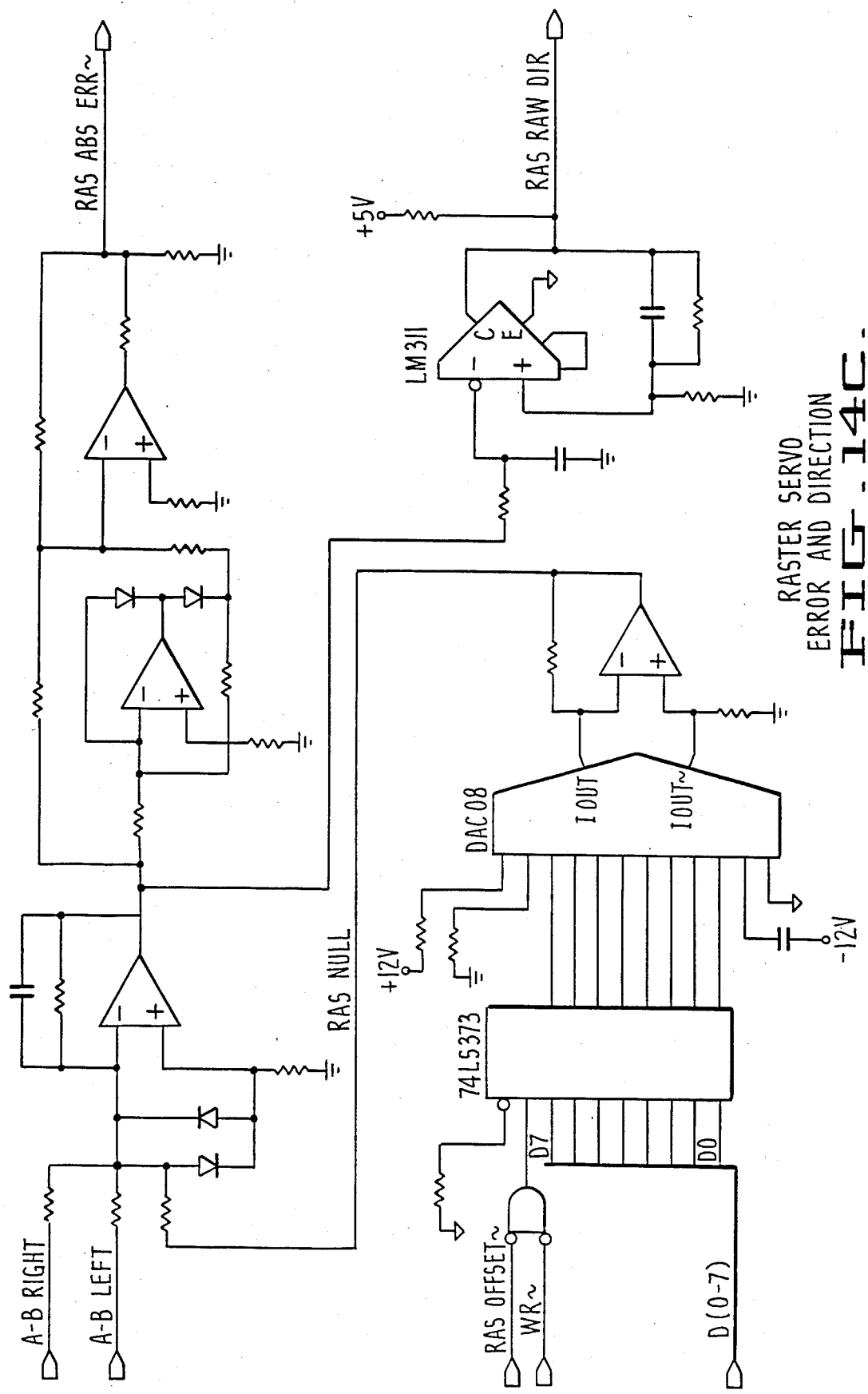
Figure 14D:
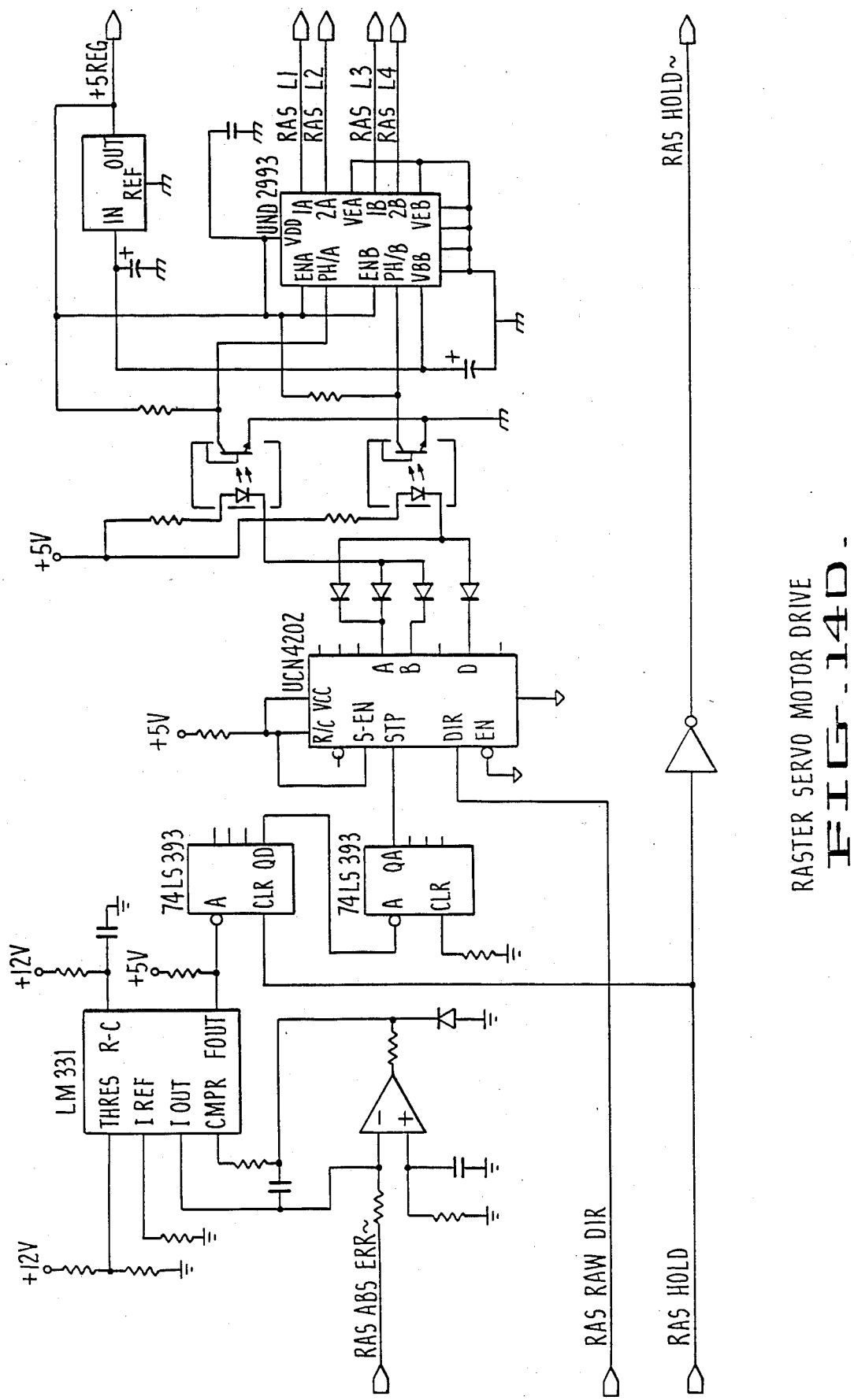

The circuitry for generating the Start-of-Plot signal is shown in FIGS. 14A, 14B and 14D. The two signals A-B RIGHT and A-B LEFT which are generated as described above with respect to FIG. 14A are provided to the circuitry shown in FIG. 14B. Each is filtered and stored in a sample-and-hold circuit. The stored A-B levels are used as a reference against the current rapidly-varying A-B signal that is the SOP transition. The stored value allows correction for variation in the difference between the distance between the two tracking lines 24 and the distance betwee the two lateral detectors 42. A SOP-DETECT signal is then provided to the processor associated with printer 10.

The Start-of-Plot signal may not be accurate enough to be repeatable to one line. However, as shown in FIG. 12A, since timing marks 22 are printed in "two-on, two-off" configuration, if the Start-of-Plot signal makes its transition within a window composed of four printed lines, then the logic circuitry associated with the write head signal processing electronics will know that the last line of that four-line window is the first line of the plot.

As stated above, the signal used to generate the line print enable pulse for the first, non-registered print station is derived from encoder 25.

When printer 10 is in the idle mode and a plot request is received, printer 10 generates a set or series of Start-of-Plot marks 124. This allows write heads 16 to align themselves before a plot begins. When split sensors 42a, 42b associated with a particular write head 16 encounter the "Start-of-Plot" set, the zero transition is detected on each side of substrate 14 to correct for gross skew error. The time difference between the two zero crossings indicates the amount of skew error. Multiple sets of Start-of-Plot marks 124 proceeding the actual plot allow more than one attempt at producing correct skew. If the machine is plotting and a new plot request is received, then the nelot will have a single pair of Start-of-Plot marks 124 generated since the machine should already be properly skew adjusted.

It should be noted that variations in the above-described embodiment of the present invention are possible. For example, in each of the above-described embodiments, the comparison optical device need not be in virtual contact with the moving substrate; it can be mounted a distance from the substrate. In this case, light directed at and reflected from the substrate timing marks could be focused onto the comparison optical device by a lens and passed through the comparison optical device to its associated photosensors. The results of the four-signal quadrature comparison optical device arrangement described above can be similarly achieved by placing four comparison optical device sections in a prescribed arrangement removed from the substrate and utilizing beamsplitting prisms to direct the light reflected from the substrate through the sections to associated photosensors. Comparison optical devices need not be used at all; detection of the light reflected from the substrate timing marks 22 by a properly arranged array of charge coupled devices could provide the desired result.

Therefore, it should be understood that various alternatives to the structures described herein may be employed in practicing the present invention. It is intended that the following claims define the invention and that the structure within the scope of these claims and their equivalents be covered thereby.

What is claimed is:

1. A registration system for maintaining accurate correspondence between an image on a moving substrate and the action of an operating element with respect to the image, the registration system comprising:
   a series of spaced-apart timing marks formed on the substrate, the spacing between timing marks being equal to their width;
   a comparison optical device comprising adjacent stripes of alternating first and second colors, the width of the stripes being equal to the width of the timing marks, the comparison optical device being mounted such that the timing marks pass in alignment with the color stripes when the substrate is moving;
   means for illuminating the timing marks;
   detector means mounted to sense the intensity of the light reflected from the timing marks through the stripes of the first color and the stripes of the second color and to generate first and second signals, respectively, corresponding thereto; and
   means responsive the first and second signals to generate a firing signal having a frequency which is a multiple over the rate of passage of the timing marks,
   the firing signal being provided to the operating element to generate multiple firings of the operating element in correspondence to the passage of an individual timing mark.

2. A registration system for maintaining accurate correspondence between an image on a moving substrate and the action of an operating element with respect to the image, the registration system comprising:

a series of spaced-apart timing marks formed on the substrate, the spacing between the timing marks being equal to their width;

a comparison optical device comprising adjacent stripes of alternating first, second, third and fourth colors, the width of the stripes being equal to one-half the width of the timing marks, the comparison optical device being mounted such that the timing marks pass in alignment with the color stripes when the substrate is moving;

means for illuminating the timing marks;

detector means mounted to sense the intensity of light reflected from the timing marks through the stripes of the first, second, third and fourth colors and to generate first, second, third and fourth signals, respectively, corresponding thereto, means responsive to the first, second, third and fourth signals to generate a firing signal having a frequency which is a multiple over the rate of passage of the timing marks, the firing signal being provided to the operating element to generate multiple firings of at the operating element in correspondence to the passage of an individual timing mark.

3. A registration system for maintaining accurate correspondence between an image on a moving substrate and the action of an operating element with respect to the image, the registration system comprising:

(a) a series of equally spaced non-reflective, non-transmissive timing marks formed on the substrate;

(b) means for illuminating the timing marks;

(c) a comparison optical device comprising a series of equally spaced non-reflective, non-transmissive bars and transparent spaced formed on a transparent medium, the spacing configuration of the bars and spaces corresponding to the spacing configuration of the timing marks, the comparison optical device being mounted such that the timing marks pass in alignment with the bars when the substrate is moving so that the timing marks move from being substantially coincident with the bars to being aligned substantially midway between the bars with a result that the intensity of light coming from the illuminated timing marks and passing through the comparison optical device is a maximum when the timing marks and bars are substantially coincident and is a minimum when the timing marks are aligned midway between the bars;

(d) detector means for sensing the intensity of light passing through the comparison optical device when the substrate is moving thereby the detector means generates an output signal having a voltage cycle rate corresponding to the illumination cycle rate caused by the passage of the timing marks with respect to the bars of the comparison optical device; and (e) electronic means for receiving the output signal and for generating a pulsed firing signal having a pulse rate corresponding to the voltage cycle rate the pulsed firing signal being provided to the operating element to activate the operating element in correspondence with the image on the substrate and in correspondence to the passage of individual timing marks with respect to the bars of the comparison optical device.

4. A registration system as in claim 3 wherein the firing signal activates the operating element in two-to-one correspondence to the passage of each timing mark.

5. A registration system as in claim 3 wherein the electronic means comprises means for increasing the pulse rate of the firing signal such that the operating element is activated at a rate which is a multiple of the illumination cycle rate caused by passage of individual timing marks with respect to the bars of the comparison optical device.

6. A registration system as in claim 5 wherein the frequency multiplier comprises a phase locked loop.

7. A registration system as in claim 3 wherein the means for illuminating comprises ambient light.

8. A registration system as in claim 3 wherein the comparison optical device is mounted substantially in contact with the substrate.

9. A registration system as in claim 3 wherein the width of the individual timing marks is substantially equal to the distance between adjacent timing marks.

10. A registration system for maintaining accurate correspondence between an image on a moving substrate and the action of an operating element with respect to the image, the registration system comprising;

(a) a series of equally spaced non-reflective, non-transmissive timing marks formed on the substrate;

(b) means for illuminating the timing marks;

(c) a comparison optical device comprising first, second, third and fourth sections of non-reflective, non-transmissive bars and transparent spaces formed on a first, second, third and fourth transparent medium, respectively, the spacing configuration of the bars and spaces in each of the sections corresponding to the spacing configuration of the timing marks, the comparison optical device being mounted and the four sections of bars and spaces being arranged such that the timing marks pass in alignment therewith when the substrate is moving so that the timing marks move from being substantially coincident with the bars to being aligned substantially midway between the bars of the four sections such that the intensity of light coming from the timing marks and passing through a selected section is a maximum when the timing marks and the bars of the selected section are substantially coincident and is a minimum when the timing marks are aligned substantially midway between the bars of the selected section, the lines and spaces of the four sections have a phase relationship of 0°, 90°, 180° and 270°, respectively;

first, second, third and fourth detector means for sensing the intensity of light passing through the first, second, third and fourth sections of bars and spaces, respectively, and for generating first, second, third and fourth output signals, respectively, corresponding thereto, and having a voltage cycle corresponding to the illumination cycle caused by the passage of individual timing marks with respect to the bars of the respective sections of the comparison optical device; and means responsive to the first, second, third and fourth output signals for generating a pulsed firing signal having a pulse rate which is a multiple of the illumination cycle rate caused by passage of individual timing marks with respect to the bars of the respective sections of the comparison optical device;

the pulsed firing signal being provided to the operating element to generate multiple firings of the operating element in correspondence to the image on the substrate and in correspondence to the passage of an individual timing mark.

11. A registration system as in claim 10 wherein the operating element is a write head of an electrostatic printer and the firing signal causes the write head to fire at a predetermined print line rate.

12. A registration system as in claim 11 wherein the write head fires four times for the passage of each of the timing marks.

13. A registration system as in claim 10 wherein the illumination means comprises ambient light.

14. A registration system as in claim 10 wherein the four transparent mediums comprise a single transparent medium.

15. A registration system for maintaining accurate correspondence between an image on a moving substrate and the action of an operating element with respect to the image, the registration system comprising:
 (a) a series of equally spaced non-reflective, non-transmissive timing marks formed on the substrate;
 (b) means for illuminating the timing marks;
 (c) a comparison optical device comprising a first section of non-reflective, non-transmissive bars and transparent spaces formed on a first transparent medium, the spacing configuration of the bars and spaces of the first section corresponding to the spacing configuration of the timing marks, and a second section of non-reflective, non-transmissive bars and transparent spaces forming on a second transparent medium, the spacing configuration of the bars and spaces of the second section being substantially identical to the spacing configuration of the bars and spaces of the first section, the comparison optical device being mounted and the first and second sections being arranged in series such that the timing marks pass in alignment with the bars of the first and second sections when the substrate is moving so that the timing marks move from being substantially coincident with the bars to being aligned substantially midway between the bars of the first and second sections with a result that the intensity of light coming from the illuminated timing marks and passing through section is a maximum when the timing marks and bars of the selected section are substantially coincident and is a minimum when the timing marks are aligned substantially midway between the bars selected, the bars and spaces of the second section being 90° out of phase with respect to the bars and spaces of the first section;

first and second detector means for sensing the intensity of light passing through the first and second sections, respectively, of the comparison optical device when the substrate is moving and for generating a first output signal and a second output signal, respectively, having the voltage cycles corresponding to the illumination cycles caused by the passage of individual timing marks with respect to the bars of the first and second sections, respectively, of the comparison optical device; and means responsive to the first and second output signals to generate a pulsed firing signal having a pulse rate which is an integer multiple of the illumination cycle rate caused by passage of the timing marks with respect to the bars of the first and second sections of the comparison optical device;

the pulsed firing signal being provided to the operating element to generate multiple firings of the operating element in correspondence to the image on the substrate and in correspondence to the passage of an individual timing mark.

16. A registration system as in claim 15 wherein the integer multiplier equals four.

17. A registration system as in claim 15 wherein the illumination means comprises ambient light.

18. A registration system as in claim 15 wherein the first transparent medium and the second transparent medium comprise a single transparent medium.

* * * * *

UNITED STATES PATENT AND TRADEMARK OFFICE
CERTIFICATE OF CORRECTION

PATENT NO. : 4,808,832

DATED : February 28, 1989

INVENTOR(S) : David E. Doggett

It is certified that error appears in the above - identified patent and that said Letters Patent is hereby corrected as shown below:

In Column 7, Line 22, delete 15 and substitute --14--.

In Column 8, Line 49, after embodiment insert --,--.

In Column 8, Line 61, "shaw-" should be --sha- --.

Column 9, Line 34, "completey" should be --completely--.

In Column 11, Line 28, after 24 insert --are--.

In Column 11, Line 44, "signals" should be --signal--.

In Column 12, Line 10, "is", first occurrence, should be -- in --.

In Column 15, Line 52, "thereby" should be --whereby--.

Signed and Sealed this

Twelfth Day of September, 1989

Attest:

DONALD J. QUIGG

*Attesting Officer*    *Commissioner of Patents and Trademarks*